E. B. MUDGE.
Coffee-Pot.
No. 131,965.            Patented Oct. 8, 1872.
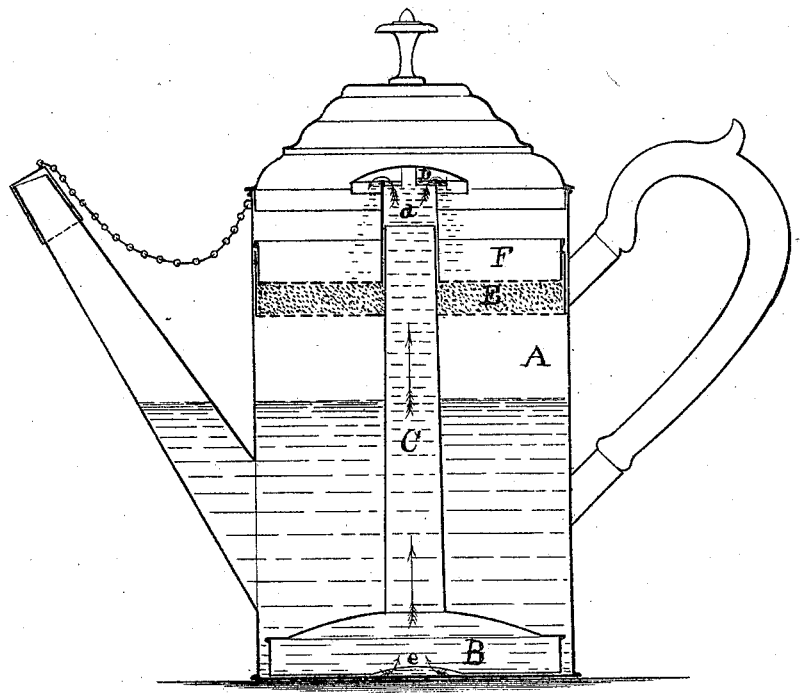

UNITED STATES PATENT OFFICE.

ERSKINE B. MUDGE, OF YONKERS, NEW YORK.

IMPROVEMENT IN COFFEE-POTS.

Specification forming part of Letters Patent No. 131,965, dated October 8, 1872.

*To all whom it may concern:*

Be it known that I, ERSKINE B. MUDGE, of Yonkers, Westchester county, in the State of New York, have invented a new and Improved Coffee and Tea Steeper, of which the following is a specification, reference being had to the accompanying drawing forming part thereof.

The drawing is a central sectional view of a coffee and tea steeper embodying my invention.

My invention relates to combining with a vessel used for steeping tea or coffee a removable perforated receptacle for containing the tea or coffee to be steeped, that is supported near the top of the vessel upon a tube which extends centrally from above the said receptacle to the bottom of the vessel and is there connected with an inverted cup, into which the said tube opens, whereby the water used for steeping the tea or coffee placed in the before-named receptacle is forced by its own ebullition upward from the bottom of the vessel, through the said tube, and above the tea or coffee, without coming in contact therewith, and then flows downward upon and through the tea or coffee that is placed in the said perforated receptacle, the said receptacle, tube, and inverted cup being all connected together and removable bodily from the said vessel.

A is the pot, in which the coffee or tea is to be steeped, made of any desired form, with a cover. Within this is placed the automatic apparatus, consisting of the shallow inverted cup B, to which is attached a tube, C, that extends up nearly to the top of the pot A. This inverted cup B has openings *e* in its sides, to permit the water in the pot to flow readily into it at the bottom. Upon the tube C is secured the coffee or tea holder E, at a point which will be somewhat above the level of the water in the pot. The bottom of this holder is finely perforated, or it may be made of fine wire-cloth. In order to prevent the coffee or tea from being thrown or floated out of the holder E by the water to be poured upon it from the tube, I fit into the holder a shallow cup, F, also having a perforated bottom, which acts as a cover upon the coffee or tea. This cover is secured to a second tube, *d*, fitted to slide down easily upon the upper end of the tube C; and over the upper end of the tube *a* is secured a concave cap, D, but elevated a little above the open end of the tube, in order that the water, as it is thrown up through the tube, shall be directed downward into the coffee-holder. The vessel or pot A should be cylindrical, or as large at the top as it is at the bottom, so that the inverted cup B that is to be introduced at the top shall fill, or nearly so, laterally the bottom of the pot. This is important, in order that the water at the bottom of the vessel and within the cup may, by its ebullition, be forced up the tube C, and not out between the sides of the cup and the walls of the pot.

The operation of this steeper is as follows: A quantity of coffee or tea is deposited in the holder E, and the cover F is placed down upon it, the tube *a* being slipped down over the tube C. The apparatus is then placed within the sleeper H, in which is a proper quantity of water, and the cover closed. The pot is then placed over the fire, and the water is caused to boil. As soon as ebullition commences the water within the inverted cup B is thereby caused to flow up through the tube C, from the open end of which it is discharged down upon the coffee or tea, through which it percolates, and, passing through the perforated bottom of the coffee-holder E, mingles again with the water in the pot.

By the method described there is accomplished, so long as the water in the pot is kept in a state of ebullition, a perpetual pouring of boiling water upon the coffee or tea and a continuous operation of leaching maintained—a method of extracting those elements of both tea and coffee that are desirable for beverages without extracting also those that are noxious or unpalatable, quite superior to boiling the tea or coffee in the water in the ordinary way.

I do not claim, broadly, an apparatus whereby there is established a circulation of the water, in steeping tea or coffee, upward from the bottom of the steeper and downward through the tea or coffee, as I am aware that a variety of steepers have been made in which this principle is employed. I intend to limit myself to the particular apparatus herein described, composed only of the inverted cup B, the tube C, the tea or coffee holder E, with its cover F and tube a, all connected together and placed within the vessel A, and removable bodily therefrom.

What I claim as my invention, and desire to secure by Letters Patent, is—

A coffee and tea steeper composed only of the vessel A, the inverted cup B, the tube C, the holder E with its cover F and tube a, all combined and operating substantially as and for the purpose specified.

E. B. MUDGE.

Witnesses:
   R. C. ELLIOTT,
   F. ELLIOTT.